United States Patent [19]

Rowley et al.

[11] Patent Number: 5,587,079

[45] Date of Patent: Dec. 24, 1996

[54] PROCESS FOR TREATING SOLUTIONS CONTAINING SULFATE AND METAL IONS.

[76] Inventors: Michael V. Rowley; Douglas D. Warkentin, both of 930 West 49th Avenue, Vancouver, B.C., V5Z 2S9, Canada; Beverly M. Piroshco, 3913 West 24th Avenue, Vancouver, B.C., V6S 1M1, Canada

[21] Appl. No.: 426,802

[22] Filed: Apr. 21, 1995

[51] Int. Cl.$^6$ .................................................. C02F 3/30
[52] U.S. Cl. ...................... 210/603; 210/605; 210/630; 210/719
[58] Field of Search .................. 210/603, 605, 210/623, 626, 630, 631, 719

[56] References Cited

U.S. PATENT DOCUMENTS

| | | | |
|---|---|---|---|
| 2,097,454 | 11/1937 | Fischer | 210/603 |
| 2,786,025 | 3/1957 | Lamb et al. | 210/603 |
| 4,200,523 | 4/1980 | Balmat | 210/603 |
| 4,632,758 | 12/1986 | Whittle | 210/603 |
| 4,735,723 | 4/1988 | Mulder | 210/603 |
| 4,839,052 | 6/1989 | Maree | 210/603 |
| 5,076,927 | 12/1991 | Hunter | 210/603 |
| 5,196,176 | 3/1993 | Biusman | 210/603 |
| 5,277,815 | 1/1994 | Beeman | 210/605 |
| 5,366,633 | 11/1994 | Busiman | 210/631 |

FOREIGN PATENT DOCUMENTS 63-88099  4/1988  Japan ..................... 210/603

OTHER PUBLICATIONS

Barnes, L. J., F. J. Janssen, J. Sherren, J. H. Versteegh, R. O. Koch, and P. J. H. Scheeren. 1991. A new process for the microbial recovery or sulphate and heavy metals from contaminated waters extracted by a geohydrological control system. *Chemical Engineering Research and Design* 69:184–186.

Barnes, L. J., F. J. Janssen, P. J. H. Scheeren, J. H. Versteegh, and R. O. Koch. 1992. Simultaneous microbial removal of sulphate and heavy metals from waste water. *Transactions of the Institution of Mining and Metallurgy* 101:C183–C189.
Bhattacharyya, D., G. Sun, C. Sund–Hagelberg, and K. Schwitzgebel. 1981. Precipitation of heavy metals with sodium sulfide: Bench–scale and full–scale experimental results. *AIShE Symposium Series* 77(209):31–38.
Dvorak, D. H., H. M. Edenborn, R. S. Hedin, and P. E. McIntire. 1991. Treatment of metal–contaminated water using bacterial sulfate reduction: resulsts from pilot–scale reactors. *Proceedings of the 1991 SME Annual Meeting.* (Denvor, CO, Feb. 25–28, 1991).

(List continued on next page.)

*Primary Examiner*—Christopher Upton
*Attorney, Agent, or Firm*—Chernoff, Vilhauer, McClung & Stenzel

[57] ABSTRACT

In accordance with the process of the invention, bacteria are used to provide hydrogen sulfide and carbonate compounds for treating solutions containing metal ions. To produce the hydrogen sulfide, the bacteria utilize sulfate ions present in the solution. Hydrogen sulfide produced by the bacteria is used to remove metals from the solution as insoluble metal sulfides. The process of the invention thereby removes sulfate and metal ions from the treated solution. The bacteria used are mixed populations, including strains of naturally-occurring sulfate reducing bacteria, which have been serially adapted and selected to be highly active with the particular solutions to be treated and with the carbon and hydrogen sources being utilized. The bacteria may be fed gaseous hydrogen and carbon nutrients produced by a partial oxidation burner. Carbonate compounds produced by the bacteria may be used to raise the solution pH for treatment and discharge. By controlling the addition of hydrogen sulfide and carbonate compounds to the solution, the preferential isolation of particular metal sulfide concentrates may be accomplished in separate precipitation steps, each with a specific pH and sulfide dosage.

29 Claims, 7 Drawing Sheets

OTHER PUBLICATIONS

Gyure, R. A., A. Konopka, A. Brooks, and W. Doemel. 1990. Microbial sulfate reduction in acidic (pH 3) strip–mine lakes. *FEMS Microbiology Ecology* 73:193–202.

Hammack, R. W., D. H. Dvorak, and H. M. Edenborn. 1993. The use of biogenic hydrogen sulphide to selectively recover copper and zinc from severely contaminated mine drainage. *Biohydrometallurgical Technologies. Proceedings of the International Biohydrometallurgy Symposium, Jackson Hole, WY.* Edited by A. E. Torma, J. E. Way, The Minerals, Metals and Materials Society. pp. 631–639.

Hammack, R. W., D. H. Dvorak, and H. M. Edenborn. 1994. Bench–scale test to selectively recover metals from metal drainage using biogenic $h_2S$. *Proceedings of the International Land Reclamation and Mine Drainage Conference and the Third International Conference on the Abatement of Acidic Mine Drainage.* (Pittsburgh, PA, Apr. 24–29, 1994), pp. 214–222.

Kim, B. M. 1981. Treatment of metal containing wastewater with calcium sulfide. *AIChE Symposium Series* 77(209):39–48.

Marchant, P. B., R. W. Lawrence, D. Warkentin, P. Elson, and M. Rowley. 1982. An integrated approach to biohydrometallurgical metal extraction, recovery, and waste treatment. *Harnessing Biotechnology for the 21st Century, Proceedings of 9th International Biotechnology Symposium and Exposition.* Crystal City, VA, Aug. 16–21, 1992).

Marchant, B. and R. W. Lawrence. 1989. *Integrated Biological Processing of Complex Sulphides for Metal Extraction and Waste Treatment.* Biohydrometallurgy, CANMET Ottawa, 205–220.

Maree, J. P., A. Gerber, and W. F. Strydon. A biological process for sulphte removal from industrial effluents. *Water SA* 12(3):139–144.

Maree, J. P., A. Gerber, and E. Hill. 1987. An integrated process for biological treatment of sulfate–containing industrial effluents. *Journal Water Pollution Control Federation*–59(12):1069–1074.

Peters, Robert W., Young Ku, and Tsun–Kuo Chang. 1984. Heavy Metal Crystallization kinetics in an MSMPR crystallizer employing sulfide precipitation. *AIChE Symposium Series* 80:55–75.

Rowley, Michael V., Douglas D. Warkentin, Vita T. Yan, and Beverly M. Piroshco. 1994. The biosulfide process: Integrated biological/chemical acid mine drainage treatment –results of labortory piloting. *Proceedings of the International Land Reclamation and Mine Drainage Conference and the Third International Conference on the Abatement of Acidic Mine Drainage* (Pittsburgh, PA, Apr. 24–29, 1994), pp. 205–213.

Scott, Murray, C. Year Unknown. An EPA demonstration plant for heavy metals removal by sulphide precipitation. *Source Unknown.*

Sheeren, P. J. H., R. O. Koch, C. J. N. Buisman, L. J. Barnes, and J. H. Versteegh. 1992. New biological treatment plant for heavy–metal contaminated groundwater. *Transactions of the Institution of Mining and Metallurgy* 101–C190–C199.

Tuttle, J. H., P. R. Dugan, and C. I. Randles. 1969. Microbial sulfate reduction and its potential utility as an acid mine water pollution abatement procedure. *Applied Microbiology* 17(2):297–302.

Author Unknown. 1992. Double–barreled bioprocess remediates metals in groundwater. *The Bioremediation Report.* May, 1992, 3–5.

PROCESS FOR TREATING SOLUTIONS CONTAINING SULFATE AND METAL IONS.

FIELD OF THE INVENTION

The invention is in the field of water treatment processes. In particular the invention is in the field of biological processes for removing sulfate and metal ions from solution.

BACKGROUND OF THE INVENTION

There are many industrial effluent solutions containing high levels of sulfates and dissolved metals. Often, treatment of these solutions represents a major expense to the source operations. For example, the mincing industry is particularly concerned with acid mine drainage resulting from the oxidation of sulfide-containing waste rock, tailings and exposed mine openings. In some cases, treating these effluents represents a major factor in determining the economic viability of an industrial operation. Often, these discharges remain a concern long after industrial operations have been abandoned.

Currently, one of the most come-on methods of treating solutions containing high sulfate and metal ion concentrations involves the use of time to raise the pH and precipitate metals as hydroxides. There are several drawbacks to this treatment method, the most significant of which is the need to dispose of the resulting metal hydroxide and gypsum sludge. These sludges can be very voluminous and the metals are subjects to re-dissolution if exposed to a low pH solution. In some jurisdictions, such sludge is considered to be a hazardous waste when it contains relatively low levels of toxic metals such as Cd, Sb or Hg and it must be stabilized and stored at considerable expense. It is likely that future discharge guidelines will continue to become more stringent in all jurisdictions, with a corresponding increase in the costs of treating such solutions to comply with environmental regulations.

Reduction of oxidized sulfur in solution occurs through the action of certain species of bacteria which, under anaerobic conditions, can utilize sulfate as an electron acceptor in their metabolism. The main genera of bacteria capable of sulfate reduction are Desulfovibrio and Desulfotomaculum. There are presently about 17 species identified in these two genera. Other sulfate reducing bacteria are members of the genera Desulfobacter, Desulfobacterium, Desulfobulbus, Desulfococcus, Desulfomonas, Desulfonema and Desulfurococcus.

Sulfate reducing bacteria are found in a variety of anaerobic environments in nature, such as marine sediments, wetlands, mud flats and standing water. They are also common in anaerobic digesters in sewage treatment plants.

Sulfate reducing bacteria can grow on a variety of substrates, ideally simple organic compounds and fermentation products such as lactate, pyruvate or citrate. Some species can grow autotrophically on $CO_2$ and $H_2$. In mixed cultures, Sulfate reducing bacteria normally exist in a symbiotic relationship with other bacterial species which can convert a wide variety of organic and inorganic substrates into compounds which can in turn be utilized by the Sulfate reducing bacteria. The nutrients which can be used to sustain sulfate reduction, therefore include organic sources such as sewage sludge, molasses and other sugars, straw and other humic acid sources, sawdust and other ground cellulose, animal matter such as fishmeal, or pure organic compounds such as organic acids and alcohols. The end products of the metabolism of sulfate reducing bacteria are either $CO_2$ or acetate, depending on the species and the substrate.

The biochemical reactions carried out as a part of the sulfate reduction process can be simplified into the following equations. For system utilizing an organic substrate, using lactate as an example:

$$C_{12}H_{22}O_{11} + H_2O \longrightarrow 4CH_3CH(OH)COOH$$

(fermentation to lactic acid)

$$2CH_3CH(OH)COO^- + SO_4^{2-} \longrightarrow 2CH_3COO^- + 2HCO_3^- + H_2S$$

(reduction of $SO_4$ to $H_2S$ and oxidation of lactate to acetate, with alkalinity generation)

This may be generalized to:

$$2C + SO_4^{2-} + 2H_2O \rightarrow H_2S + 2HCO_3^-$$

For autotrophic system using $H_2$ as an energy source, the net reaction may be represented as:

$$SO_4^{2-} + 4H_2 \rightarrow 2H_2O + H_2S + 2OH^-$$

The role of the bacteria in these reactions is to act as a catalyst for sulfate reduction through hydrogen or electron transport occurring as a part of the organism's metabolism.

Researchers studying sulfate reducing bacteria have observed a wide variation in reduction rates, depending on such factors as reactor design, substrate used, temperature, and sulfide removal efficiency.

While all Sulfate reducing bacteria are anaerobic, most species can survive exposure to oxygen. Generally, no sulfate reduction will occur when oxygen is present because the bacteria utilize $O_2$ in preference to $SO_4$. Sulfate reducing bacteria are also generally tolerant of pH changes, being most active in the pH range of 5.5–8.0, but surviving at pH levels well outside of this range. The optimum pH is 6.5–7.0 for most species. The optimum temperature is typically about 31° C.

Sulfate reducing bacteria tend to be tolerant of moderate concentrations of metals and $S^=$ in solution. High concentrations of metal ions may, however, interfere with bacterial growth and metabolism. Very high metal concentrations are generally prevented in active sulfate reducing environments through the precipitation of metal sulfides. Very high levels of sulfide ions in solution will inhibit sulfate reducing bacteria, so that any reactor design must incorporate adequate sulfide removal.

The application of sulfate reducing bacteria to sulfate-containing wastes has been studied for many years in substantial detail (Barnes et al 1991, Dvorak et al 1991, Gyure et al 1990, Hammack et al 1993 and 1994, Maree et al 1986 and 1987, and Tuttle et al 1969). Conventional biological sulfate reduction utilizes a bioreactor where sulfate reducing bacteria grow on some form of solid support or in a sludge bed. Sulfate is metabolized according to the equation shown below:

$$SO4 + Nutrients + H_2O \rightarrow H_2S + HCO_3^-$$

The biogenic $H_2S$ produced by sulfate reducing bacteria may be used for metal sulfide precipitation. Metal sulfide precipitation may occur when solutions containing metal ions are contacted with $H_2S$ gas. A general equation for this reaction shown below (where $M^{2+}$ represents a metal ion having a valence of 2+):

$$M^{2+} + S^{2-} \rightarrow MS$$

Commonly, the solution to be treated will be at a low pH, meaning that the solubility of $S^{2-}$ will be low. In order to effectively remove all metals from solution, $H_2S$ solubility must be increased by raising the solution pH or by increasing the partial pressure of $H_2S$ in the system, since the solubility of $S^{2-}$ increases substantially with relatively small increases in pressure. Catalysts may also be beneficial for increasing reaction rates. At low pH values, at which $S^{2-}$ solubility is also low, Hg, Ag, Cu and Bi are readily removed and $Fe^{3+}$ is reduced to $Fe^{2+}$ by oxidation of $S^{2-}$. At elevated pH values and higher $S^{2-}$ concentrations, Cd, Pb and Zn are easily removed. Co, Ni, Fe, Mn and other less common metals can also be removed with the proper conditions. $As^{3+}$ is also precipitated at low pH as $As_2S$, which is slightly soluble so that a residual As concentration will remain in solution.

The solubilities of these sulfides are invariably lower than those of the corresponding metal hydroxides and they will be less likely to redissolve if the pH of the solution should decrease.

In addition to metal sulfides, biogenic $H_2S$ may be used to form elemental sulfur by any one of several means, the most common being that of the Claus process shown below:

$$2H_2S+SO_2 \rightarrow 3S^0+2H_2O,$$

or through the use of $Fe^{3+}$ in solution:

$$2Fe^{3+}+S^{2-} \rightarrow S^0+2Fe^{2+}.$$

Biogenic $H_2S$ may also be used to form other potentially valuable compounds; for example, NaHS:

$$2H_2S+Na2CO_3 \rightarrow 2NaHS+H_2CO_3.$$

Many prior art sulfate reduction processes treat the entire stream in a bioreactor. This gives rise to significant limitations in terms of how such processes may be applied and in their effectiveness. Typically, the sensitivity of the bacterial population to low pH and high metal loading necessitates prohibitively long retention times for the treatment of highly contaminated streams. In addition, because the entire solution enters biological treatment, the bioreactor is typically subjected to widely varying conditions of flow and feed stream strength, with seasonal fluctuations, making it difficult to maintain the chemostat conditions necessary for optimum bioreactor performance.

The nature of the sludge produced by many prior art sulfate reduction processes gives rise to a variety of problems. If sulfide sludge is precipitated in the bioreactor, it may cause problems of plugging, abrasion, and toxicity. For example, a large volume of sludge may be contaminated by a single toxic metal sulfide, increasing the overall expense associated with sludge disposal. The sludge may also contain biomass (lost from the bioreactor), which further increases the volume of sludge for disposal, raising disposal costs. Conventional sulfate reduction processes are, however, well suited to certain specific applications, particularly those concerned with treatment of stream with low metal ion concentrations (Barnes et al, 1992), and those requiring a complete removal of sulfate.

Prior art processes in the field of sulfate reduction use either prohibitively expensive nutrients such as ethanol or lactate, or microbially challenging nutrients such as compost or other organic waste, thereby necessitating prohibitively large reactors and/or reaction times. In either case, the economic viability of the process suffers substantially.

Partial oxidation burners have been used extensively in the petroleum and chemical industries for a number of years. Partial oxidation burners are typically used to produce large quantities of extremely pure hydrogen. These prior art burners are generally orders of magnitude too large for use in providing feedstock to a microbiological culture. Prior art partial oxidation burners are generally designed to produce gases to a higher standard of purity than is required for microbiological feedstock. Such burners typically consume pure oxygen and operate at high pressures (400–3000 psi) and temperatures (2000° F., for example), adding to their expense.

In a partial oxidation burner, a hydrocarbon fuel is oxidized in an oxygen-limited environment in which oxidation of the hydrocarbon is halted at the production of CO and $H_2$, rather than proceeding to complete oxidation of the hydrocarbon to $CO_2$ and $H_2O$. A second stage may be included in the partial oxidation burner to convert $H_2O$ and CO to $H_2$ and $CO_2$.

In the first stage of the partial oxidation process, a hydrocarbon, such as methane is reacted with a limited quantity of air, as follows:

$$CH_4+\frac{1}{2}O_2 \rightarrow CO+2H_2$$

The oxidation of the hydrocarbon feedstock is an exothermic reaction such provides heat for the second stage of the partial oxidation reaction and also provides a substantial amount of excess heat.

The first stage reaction can occur at ambient pressure, or at much higher pressures. The reaction must be catalyzed if the reactor temperature is less than about 1300° K. Higher temperatures are also required if longer-chain hydrocarbon feedstocks are used (eg. >C4), to reduce 'cracking' and maintain the desired hydrogen-producing reaction.

In the second stage of the partial oxidation process, the gas mix resulting from the first-stage partial oxidation reaction is taken directly into a second chamber. In the second chamber, CO is reacted with water (steam) in the presence of a catalyst (usually NiO) to produce additional $H_2$, as follow:

$$CO+H_2O \rightarrow CO_2+H_2$$

The second, stage reaction is endothermic and consumes some of the heat generated in the first stage.

SUMMARY OF THE INVENTION

The process of the invention integrates a biological stage and a chemical stage to adjust the composition of a solution containing sulfate and metal ions. In the chemical stage, the solution passes through a stage in which biogenic $H_2S$ gas is used to precipitate metal ions from the solution as insoluble metal sulfide. Conditions such as the pH of the solution or the. $H_2S$ addition rate may be adjusted to allow preferential precipitation of a selected metal sulfide in the chemical stage.

After treatment in the chemical stage, at least a portion of the solution is diverted to the biological stage while the reminder may be discharged or treated further. In the biological . stage, sulfate is reduced to hydrogen sulfide. The hydrogen sulfide is then stripped from the solution. At least a portion of the biogenic hydrogen sulfide is transported back to the chemical stage for use in metal sulfide precipitation.

The fraction of solution to be treated biologically will normally be controlled by the amount of hydrogen sulfide required for sufficient metal ion removal. However, to reduce the concentration of sulfate in the solution, a greater portion of the solution may be diverted to the biological stage than is required for the production of hydrogen sulfide. In some cases, the alkalinity requirements of the chemical stage will dictate the amount of solution that must be treated biologically. Excess hydrogen sulfide that is not required for metal sulfide precipitation may be used to produce sulfide salts.

Alkaline carbonate compounds are a by-product of the microbiological production of hydrogen sulfide by sulfate reducing bacteria in the biological stage. The biogenic carbonate produced by the microbiological culture may be precipitated by aeration of the solution and may be transferred to the chemical stage to adjust the pH of the solution.

In one embodiment, the process of the invention includes the steps of:

(a) Adding hydrogen sulfide to the solution. This may be accomplished by in-line mixing of hydrogen sulfide and the solution.

(b) Precipitating a sulfide of the metal ions from the solution. The precipitated metal sulfide solid may be collected and a portion of the collected metal sulfide solid may be added to the solution in conjunction with the step of adding hydrogen sulfide to the solution, to nucleate further precipitation of metal sulfide solids. The step of precipitating a sulfide of the metal ions from the solution may be repeated and precipitation conditions may be adapted to precipitate a selected metal sulfide in each such step. For example, the precipitation conditions may be adapted by adjusting the pH of the solution, adjusting the hydrogen sulfide concentration of the solution or adjusting the amount of collected metal sulfide solids that are added to the solution in conjunction with the step of adding hydrogen sulfide to the solution.

(c) Feeding a portion of the solution to an anaerobic microbiological culture adapted to utilize the sulfate ions and produce hydrogen sulfide. The anaerobic microbiological culture may include naturally-occurring sulfate reducing bacteria. The anaerobic microbiological culture may be serially adapted to treat the solution and to utilize the gaseous nutrients mentioned in step (d).

(d) Feeding the anaerobic microbiological culture gaseous nutrients produced by a partial oxidation burner. The gaseous nutrients may be hydrogen and a carbon oxide.

(e) Stripping hydrogen sulfide produced by the microbiological culture from the solution using a carrier gas produced by the partial oxidation burner. The carrier gas may be nitrogen. A portion of the hydrogen sulfide stripped from the solution is used in step (a) above. A portion of the hydrogen sulfide stripped from the solution may be reacted with an alkaline compound, such as CaO, $Ca(OH)_2$, $Na_2CO_3$, or NaOH, to produce a sulfide salt, such as CaS, $CaSH_2$, $Na_2S$ or NaHS.

To minimize the potentially adverse affect of the metal sulfides on growth of the microbiological culture, steps (b) and (c) may be substantially physically separated.

Before the treated solution is discharged to the environment, but after precipitating the metal ions from the solution as a metal sulfide, hydrogen sulfide may be stripped from the portion of the solution that is not fed to the microbiological culture. The hydrogen sulfide may be stripped from the solution by mixing the solution with a carrier gas.

The nutrients fed to the microbiological culture may include a carbon nutrient. The microbiological culture may utilize the carbon nutrient to produce carbonate ions. Where the microbiological culture produces carbonate ions, the solution may be aerated to precipitate a carbonate compound after being treated according to step (c) above.

The partial oxidation burner used in step (d) may be fed a mixture of air and a hydrocarbon fuel. The air and fuel mixture is combusted to produce the gaseous nutrients and the carrier gas which are used, respectively, in steps (d) and (e) above. The hydrocarbon fuel may be methane, natural gas or propane. The mixture fed to the burner my be made up of 0.3 liters of hydrocarbon fuel per liter of air. The following blends of the gaseous nutrients and the carrier gas may be produced by the partial oxidation burner:

(a) approximately 20% CO, 40% $H_2$ and 40% $N_2$; or (b) approximately 17% $CO_2$, 50% $H_2$ and 33% $N_2$.

Steps (c) and (d) of the process, as set out above, may be carried out in a bioreactor. The bioreactor can have a hollow body with an interior adapted to hold the solution under anaerobic conditions. The bioreactor may be provided with an input port adapted to introduce the solution into the bottom portion of the interior of the bioreactor's hollow body. The bioreactor may be provided with an output port adapted to remove solution from the top portion of the interior of the bioreactor's hollow body.

The bioreactor input port may include a pipe passing into the interior of the bioreactor's hollow body through the top portion of the hollow body. The pipe may extend downwardly to the bottom portion of the interior of the bioreactor's hollow body. Hollow arms may be connected to the pipe and extend outwardly from the pipe in the bottom portion of the interior of the bioreactor's hollow body. The hollow arms may be in fluid communication with the pipe and have apertures. The pipe and hollow arms may be made to be rotatable within the interior of the hollow body. The solution, gaseous nutrients and the carrier gas may be transported into the interior of the bioreactor's hollow body through the pipe and the hollow arms, and then through the apertures on the hollow arms into the interior of the bioreactor.

A solid support material may be provided within the interior of the hollow body. The hollow arms may have blades extending from them, the blades being adapted to move a precipitate within the interior of the bioreactor's hollow body.

The solution may be passed from the bioreactor output port to a separation vessel for degassing. The separation vessel may have a gas vent for venting gas on its upper portion, and a solution discharge port for discharging the solution on its lower portion. At least a portion of the solution discharged from the separation vessel may be recycled to the bioreactor.

To reduce the pH of the solution in the separation vessel and thereby reduce the solubility of $H_2S$ in the solution in the separation vessel, fresh solution which has not been treated in the bioreactor may be fed into the separation vessel.

To precipitate a carbonate compound, the solution may be aerated after being discharged from the separation vessel. The process of precipitating the carbonate compound may include the steps of:

(a) Aerating the solution under high shear mixing conditions in a tank.

(b) Discharging the solution from the tank into a settling device.

(c) Precipitating the carbonate compound from the solution in the settling device. A portion of the precipitated carbonate compound may be recirculated to the tank to nucleate precipitation of the carbonate compound.

A process for selectively precipitating a first and a second carbonate compound, such as $MgCO_3$ or $CaCO_3$, may include the steps of:

(a) aerating the solution under high shear mixing conditions in a tank, the conditions in the tank being adapted to precipitate the first carbonate compound;
(b) discharging the solution from the tank into a settling device;
(c) precipitating the carbonate compound from the solution in the settling device;
(d) transferring the solution from the settling device to a second tank;
(e) aerating the solution under high shear mixing conditions in the second tank, the conditions in the second tank being adapted to precipitate the second carbonate compound;
(f) discharging the solution from the second tank into a second settling device; and,
(g) precipitating the second carbonate compound from the solution in the second settling device.

A second separation vessel may be provided in fluid communication with the bioreactor output port and the separation vessel. The solution may be passed from the bioreactor output port to the second separation vessel. A portion of the solution in the second separation vessel may then be passed to the separation vessel. A portion of the solution in the second separation vessel may then be discharged without being passed to the separation vessel. The second separation vessel may have a second gas vent on its upper portion and a second solution discharge port on its lower portion.

The invention provides a process for treating a solution containing sulfate and metal ions comprising the steps of:
(a) adding hydrogen sulfide to the solution;
(b) precipitating sulfides of the metal ions from the solution;
(c) feeding a carbon nutrient and a portion of the solution to an anaerobid microbiological culture adapted to:
   (i) utilize the sulfate ions to produce hydrogen sulfide; and,
   (ii) utilize the carbon nutrient to produce carbonate ions;
(d) stripping hydrogen sulfide produced by the microbiological culture from the solution, a portion of the hydrogen sulfide stripped from the solution being used in step (a); and,
(e) aerating the solution to precipitate a carbonate compound derived from the carbonate ions produced by the microbiological culture.

To minimize the potentially adverse affect of the metal sulfides on growth of the microbiological culture, steps (b) and (c) are substantially physically separated and metal sulfides are precipitated from the solution before it is fed to the microbiological culture.

The invention provides a bioreactor that includes a hollow body having an interior adapted to hold a solution under anaerobic conditions. A pipe passes into the interior of the hollow body through the top portion of the hollow body and extends downwardly to the bottom portion of the interior of the hollow body. Hollow arms are connected to the pipe and extend outwardly from the pipe in the bottom portion of the interior of the hollow body. The arms have apertures and are in fluid communication with the pipe. An output port on the bioreactor is adapted to remove the solution from the top portion of the interior of the hollow body. The pipe and hollow arms are rotatable within the interior of the hollow body.

DETAILED DESCRIPTION OF THE INVENTION

Figure 1:
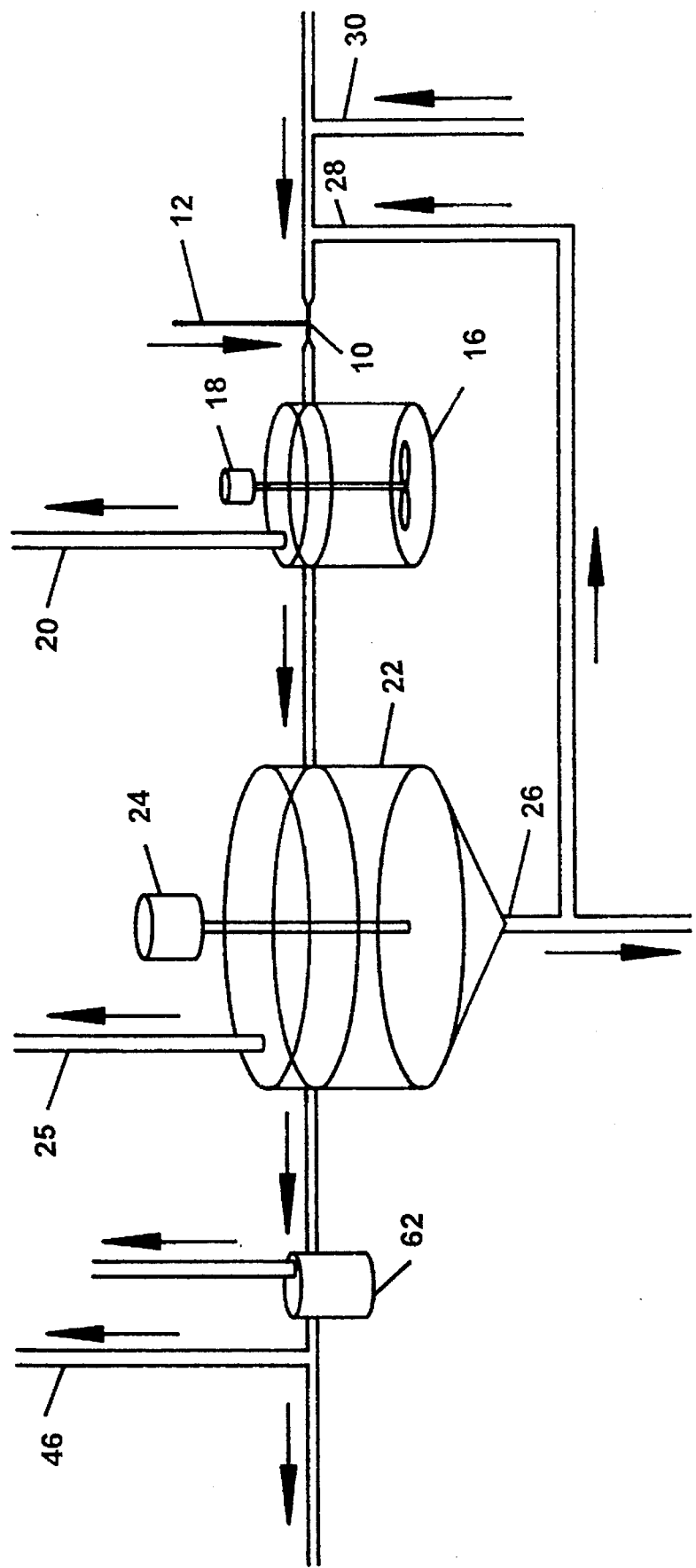
FIG. 1 is a schematic diagram showing aspects of the chemical precipitation stage of the process of the invention.
Figure 2:
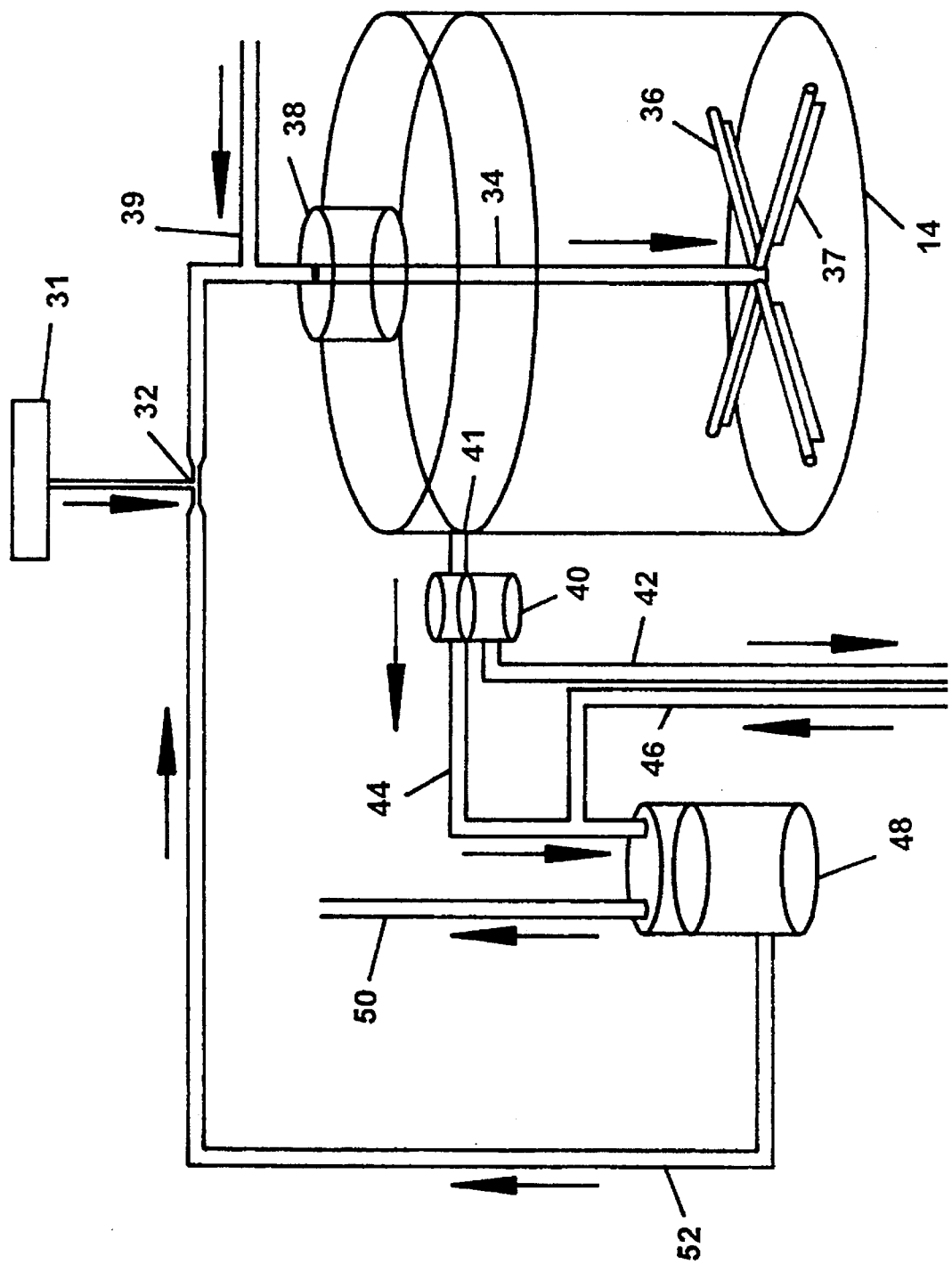
FIG. 2 is a schematic diagram showing a bioreactor of the invention and aspects of the biological stage of the process of the invention.
Figure 3:
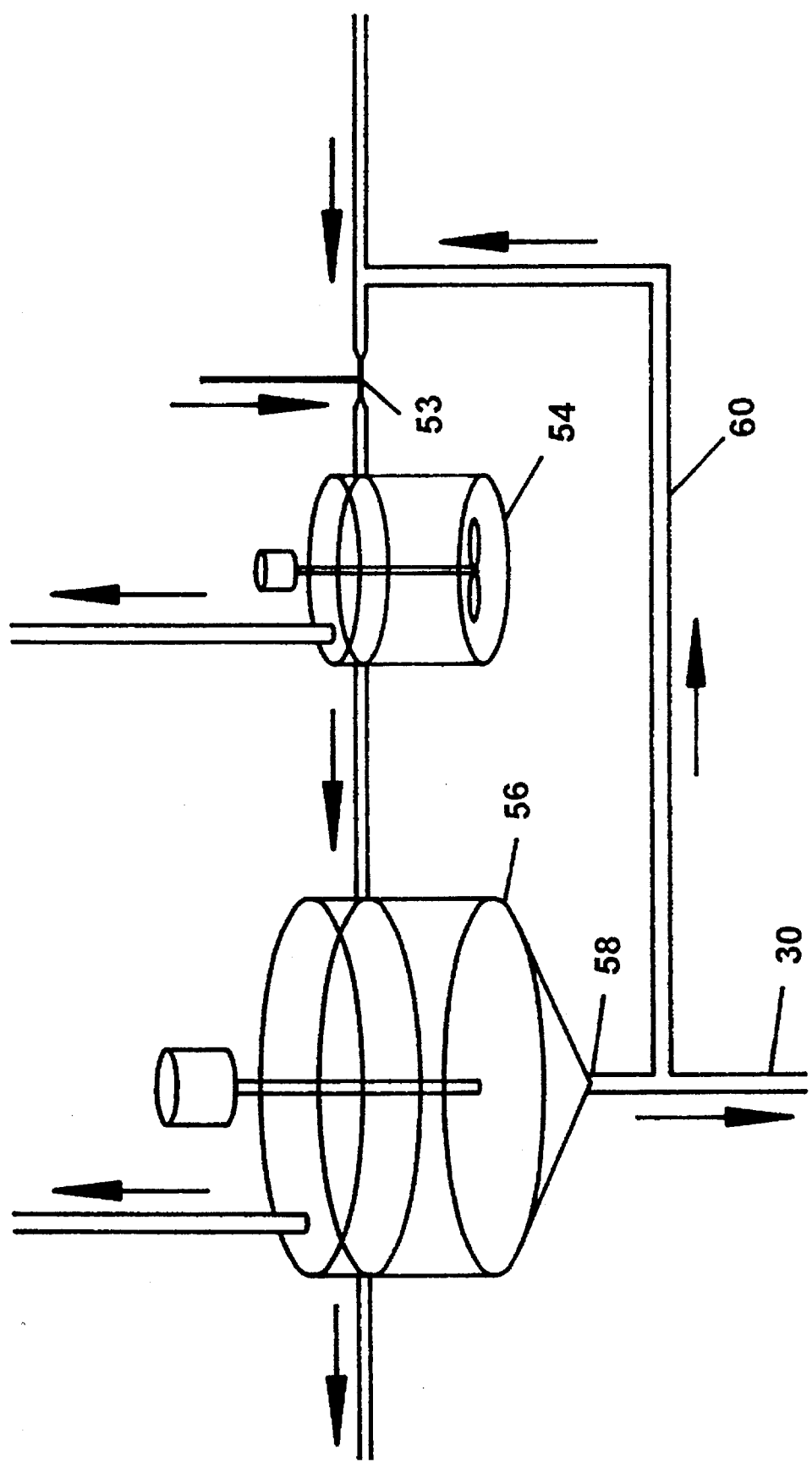
FIG. 3 is a schematic diagram showing aspects of the process of the invention relating to the precipitation of carbonate compounds.

As illustrated in FIGS. 1, 2 and 3, the process of the invention is used for treating a solution containing sulfate and metal ions. Hydrogen sulfide may be added to a solution in an in-line mixer 10. The use of an in-line mixer 10 maximizes sulfide-solution contact. Other turbulent-flow-inducing devices may be used instead of in-line mixer 10.

Hydrogen sulfide for addition to the solution is provided via flow line 12. The hydrogen sulfide is produced by a microbiological culture contained in bioreactor 14 (FIG. 2). The off-gas from the bioreactor 14 typically contains from 0.01%–10% $H_2S$, but preferably contains from 1%–5% $H_2S$.

After hydrogen sulfide is added to the solution, the solution flows into tank 16 to provide sufficient time for metal sulfide precipitate formation prior to separation of precipitated solids from the liquid. Tank 16 is provided with stirrer 18 to mix the solution and facilitate flocculation. Vent 20 releases gases from tank 16 to facilitate degassing of the solution.

The reaction of hydrogen sulfide with the solution may take place entirely in-line. As an alternative to stirred tank 16, the solution may be transferred to a simple degassing vessel, such as a small, unmixed, vented tank, prior to separation of precipitated solids from the liquid.

A high capacity thickener 22 may be used to maximize the settling of solid metal sulfides. Thickener 22 is provided with a stirred rake 24 to prevent cementation of metal sulfides in thickener 22. Alternative thickeners, clarifiers or filters may be used to separate solid metal sulfides from the solution.

Metal sulfides precipitated in thickener 22 are recovered through port 26. A portion (eg. 1:1 to 100:1 recycle ratio, expressed as a ratio of recycled solids to new solids formed) of the recovered metal sulfide solids are recycled through pipe 28 and added to the solution to nucleate further metal sulfide precipitate formation and to promote coagulation and agglomeration of metal sulfide particles. The solids may be recycled in the form of a thickened sludge, and introduced at, or immediately preceding, the addition of the hydrogen sulfide to the solution at in-line mixer 10. Similarly, the pH of the solution may be adjusted by adding alkaline compounds to the solution through port 30 in conjunction with the addition of hydrogen sulfide to the solution.

The formation of different metal sulfides proceeds at widely varying rates and to varying degrees under a given set of solution conditions, such as pH, sulfide concentration and nucleation site availability (i.e. seed sludge concentration). Under conditions of elevated pH and unlimited sulfide availability, most metals will be precipitated to leave very low metal ion concentrations in solution. If different metal ions are present in the solution, a mixed sludge containing various metal sulfides will form under such conditions.

Parameters such as pH of the solution, sulfide dosage and volume of sludge recycled may be adjusted to maximize the removal of selected metal sulfides. The process of the invention may incorporate more than one stage in which different metals are recovered or isolated. Each such stage may include hydrogen sulfide addition and mixing, a tank for degassing and flocculating the solution, and a device such as a thickener or clarifier for separating the solid metal sulfides form the solution. Hydrogen sulfide, alkalinity and recycled seed sludge are added to the solution as required to establish the specific conditions for that stage. Alkaline compounds may be obtained from an outside source (eg. $Ca(OH)_2$, CaO, $Na_2CO_3$, NaOH, $MgCO_3$, $CaCO_3$, etc.), from liquid discharge coming from the bioreactors, or from solids precipitated from the bioreactor discharge. A separate, solid metal sulfide product may be produced from each stage. The number of stages will be determined by the total metal removal and the degree of separation required to meet the process objectives for a given application.

To illustrate the selective recovery of metal sulfides, an example can be described for the treatment of a solution of pH 2.5 with 100 mg/L copper, 200 mg/L zinc, 1000 mg/L aluminum and 1500 mg/L iron, requiring removal of all metals and neutralization of the pH. The first stage would remove copper, and would be carried out at the initial stream pH, with a sulfide dosage above 50 mg per liter of solution treated and a sludge recycle ratio of at least 10:1 (the ratio of recycled solids to new solids formed). Reaction time would be limited to about 5 minutes. After solid-liquid separation, the solution would proceed to the second stage for zinc removal. Alkaline compounds would be added to raise the pH to the range 3.0–3.75, with further addition as required to maintain this pH in the precipitation vessel. Sulfide dosage would be increased to above 200 mg per liter, with a similar sludge recycle rate to that of the copper stage. Retention time for zinc precipitation would be longer, typically up to one hour. After the second solid-liquid separation, solution pH would be raised to 5.5–6.5 for combined aluminum and iron removal. This pH is maintained with constant addition of alkaline compounds and a large dose of sulfide is added (more than 3 grams/liter). The ratio of recycled solids to new solids may be up to 25:1, and the retention time may be up to 4 hours prior to a final solid-liquid separation stage. A polished solution from which metal ions have been removed is discharged from the metal sulfide precipitation circuit.

A portion of the solution from the final stage of the metal sulfide precipitation circuit is directed via pipe 46 to bioreactor 14. Such solutions are typically neutral or slightly acidic (pH 3–6) and have a substantial proportion of the original sulfate remaining in solution (up to 100%). The proportion of the total solution that is fed to the bioreactors can range from less than 1% to more than 90%, depending both on the nature of the waste stream and the objectives of solution treatment.

The solution that is directed to bioreactor 14 is mixed with gaseous nutrients produced by the controlled partial oxidation of hydrocarbon fuels in a partial oxidation burner 31. Gases from partial oxidation burner 31 may be used to meet the hydrogen and carbon requirements of the anaerobic macrobiological culture in bioreactor 14. Gases from partial oxidation burner 31 may be mixed with the solution by in-line mixer 32, prior to feeding the solution and gases to the microbiological culture in bioreactor 14. Excess heat from burner 31 may be used to maintain the microbiological culture at an appropriate temperature.

One aspect of the invention involves the use of a carrier gas produced by partial oxidation burner 31 to strip hydrogen sulfide produced by the microbiological culture from the solution. If air is used as a source of oxygen for partial oxidation burner 31, the gas mixture produced by the partial oxidation burner 31 will include $N_2$. The $N_2$ gas from partial oxidation burner 31 may then be used to strip hydrogen sulfide gas from the solution and to transport the biogenic hydrogen sulfide to the precipitation stage of the process.

For the present invention, a one-stage partial oxidation burner 31 may be adequate in some applications. An advantage to this approach is that no catalysts are required to operate a single stage burner if the burner is operated at a suitable temperature. Eliminating the need for a catalyst may reduce both the capital and operating expenses associated with the process of the invention. Also, a catalyzed system necessitates a very clean feedstock, requiring filtering of the incoming hydrocarbon to remove impurities, adding additional capital and operating expenses to the process. However, if efficient hydrogen production is of primary importance, a two-stage partial oxidation burner 31 may be preferred because it will yield proportionately more hydrogen than a single-stage burner.

Monitoring and controlling the feedstocks and products of partial oxidation burner 31 may be useful to optimize the process of the invention, and for safety. For example, premixing and preheating of the air and fuel mixture is highly beneficial to burner efficiency. It is also important to note that in the process of the invention, any oxygen in the product gas may have a detrimental effect on the performance of the anaerobic microbiological culture in bioreactor 14. The process of the invention does not, however, require very precise control over partial oxidation burner 31, as is provided for on prior art burners that are used for other purposes. For the process of the invention, controls may only be required to ensure reasonable burning efficiency, to monitor the approximate quantities of $H_2$, CO and $CO_2$, and to detect any $O_2$ being fed to bioreactor 14. Other burner products, such as water, $NO_x$ or $SO_2$, would not generally pose a problem in the process of the invention (and may even be of benefit in some cases).

A reaction called 'steam reforming' may also be used to produce hydrogen and carbon nutrients for the process of the invention, as follows:

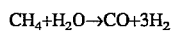

$$CH_4 + H_2O \rightarrow CO + 3H_2$$

Steam reforming is an endothermic reaction that must be catalyzed. The CO produced by this reaction can be further reacted with water to produce $CO_2$ more $H_2$. However, as both reactions are endothermic, a considerable quantity of heat must be supplied from an outside source.

To optimize the process of the invention, an appropriate ratio of hydrogen, carbon and sulfur feedstock should be provided to the microbiological culture. A $H_2$:C:S ratio of 4:1:1 may, for example, be used. To optimize stripping of $H_2S$ from the solution, the gas produced by partial oxidation burner 31 should include an appropriate amount of $N_2$ as carrier gas. For example, a mixture including 40% $N_2$ may be used. In view of the foregoing requirements, an appropriate bioreactor feed gas mix would comprise approximately 48% $H_2$, 40% $N_2$, and 12% $CO_2$ or CO. In practice, appropriate bioreactor feed gas mixes of either 40% $H_2$, 40% $N_2$, and 20% CO (for a one-stage burner system); or 50% Ha, 33% $N_2$ and 17% $CO_2$ (for a two-stage burner system) may be produced by partial oxidation burner 31 using methane as fuel in reaction with air.

The results of experimental testing of the process of the invention suggest that the reaction of CO with water to produce hydrogen may be occurring in the bioreactors, catalyzed by one or more of the bacterial species in the culture. This biological reaction may effectively reduce the hydrogen requirement of the microbiological culture. The extent of biologically catalyzed hydrogen production will vary with the composition of the bacterial population in the culture and should be quantified as part of the burner design and selection process.

At sites where methane is not available, the process of the invention may use liquid propane as the preferred hydrocarbon fuel for partial oxidation burner 31. The partial oxidation reactions would then read as follows:

First Stage:
$$CH_3CH_2CH_3 + 1\underline{1/2}O_2 \longrightarrow 3CO + 4H_2$$

Second Stage:
$$3CO + 3H_2O \longrightarrow 3CO_2 + 3H_2$$

Other feedstocks can also be utilized by a partial oxidation burner, although reduced efficiency and increased problems of carbon fouling can be expected with larger molecular weight fuels such as diesel oil.

In one embodiment, the process of the invention uses a single-stage partial oxidation burner that is fed a gas mixture of 0.3 liters $CH_4$ (in the form of natural gas) per liter of air. In this embodiment, the gas stream produced by the burner would have an approximate composition of 20% CO, 40% $H_2$ and 40% $N_2$. Alternatively, a catalytic second stage may be added to the burner, to produce a gas stream comprising approximately 17% $CO_2$, 50% $H_2$ and 33% $N_2$.

Typically, the microbiological culture's requirement for $H_2$ for sulfate reduction will be the parameter controlling the amount of nutrient and carrier gas to be added to the culture from the partial oxidation burner. Theoretically, 4 moles of $H_2$ are required for each mole of $SO_4$ reduced (i.e. 90 liters of $H_2$ gas @ STP for the reduction of 96 grams of sulfate in solution). In practice, more than the theoretical amount of $H_2$ will be required, due to inefficiencies in $H_2$ uptake and utilization in the bioreactor.

The rates at which other components of the burner gas steam are added to the culture will generally be controlled by their proportion relative to the amount of $H_2$ required by the culture. For example, more CO or $CO_2$ will typically be produced by partial oxidation burner 31 than is required for sulfate reduction by the microbiological culture. Some of the excess gaseous carbon nutrients may be taken up by other bacteria in the culture.

Solution and gases from partial oxidation burner 31 are fed into bioreactor 14 through a central pipe 34, as shown in FIG. 2. Pipe 39 allows other nutrients to be added to the solution and gas mixture before the solution is transported into bioreactor 14. Pipe 34 passes through a mechanical seal 38 in the top of bioreactor 14 to prevent leakage of air or gases. To aid in mixing, bioreactor 14 may have a rotatable rake mechanism attached to pipe 34 at or near the bottom of the bioreactor. The entire rake mechanism may rotate slowly about central pipe 34 (for example, in the range of 0–60 r.p.m.). The design of the rake may vary, depending on the application and the size of the bioreactor. The rake may have four hollow arms 36 extending outwardly from central pipe 34 nearly to the walls of bioreactor 14. Arms 36 may have blades 37 to move accumulated solids in bioreactor 14. Apertures on arms 36 allow solution and gases to flow into bioreactor 14.

As an alternative to solution and/or gas introduction through a hollow pipe and rake mechanism, these fluids may be fed into bioreactor 14 through a series of small inlet holes connected by a fixed network of piping at the bottom of bioreactor 14.

The hollow body of bioreactor 14 may be of a cylindrical or similar shape. The height to diameter ratio of bioreactor 14 can range from very low values (i.e. 1:10 or even lower in very large reactors) to 1:1 or higher (but generally less than 2:1). A range of 1:1.5 to 1:1 may be preferred.

Bioreactor 14 may be constructed of a material resistant to corrosion by weak acids or sulfides, such as plastics, fibreglass, stainless steel, or ordinary metal or concrete lined with a chemically resistant coating. Bioreactor 14 is adapted to maintain the microbiological culture under anaerobic conditions and is therefore enclosed to prevent entry of air.

Bioreactor 14 is filled to an outlet port 41 near the top of its cylindrical hollow body. To help hold bacteria in bioreactor 14 and to aid in gas dispersion, bioreactor 14 may be filled from 20% to 90% with buoyant to semi-buoyant solid support material (with a specific gravity of approximately 0.9 to 1.1). This material is generally in the form of discrete pieces of moulded or stamped plastic, being spheroidal, cylindrical or some similar shape, 2–30 cm across and being designed with ribs or holes to provide very high total void space when packed together. Such material is often manufactured as packing material for gas or solution stripping towers.

Solution and entrained gas may enter bioreactor 14 at or near the bottom of its hollow interior and flow upward at a rate which gives a solution retention time of a few hours (e.g. 2–10 hours). Solution, hydrogen sulfide and nitrogen carrier gas, along with any unused nutrient gases, exit at or near the top of bioreactor 14 through outlet port 41 into a small separation vessel 40. The solution may be held in separation vessel 40 for up to a few minutes to allow entrained gases to separate from the solution.

In one embodiment, not shown, gases may be vented from separation vessel 40, to be transported to the chemical precipitation stage shown in FIG. 1. A portion of the solution (typically equal to the amount of fresh solution entering bioreactor 14) may be withdrawn from separation vessel 40 for discharge, while the remainder of the solution (for which the flow rate may be 1–50 times the feed rate of fresh solution into bioreactor 14, but is more commonly 5–10 times that feed rate) may be pumped back into bioreactor 14 as a recycle stream.

As shown in FIG. 2, the process of the invention may include two gas-liquid separation vessels 40, 48, with discharge solution being removed from one separation vessel 40 through pipe 42, and the recycle portion continuing through pipe 44 to the other separation vessel 48. Fresh bioreactor feed solution, which has a lower pH than the solution leaving bioreactor 14, is added through pipe 46 to separation vessel 48. The addition of fresh bioreactor feed solution to separation vessel 48 reduces the solution pH in separation vessel 48, thus lowering the solubility of $H_2S$ and improving $H_2S$ gas removal in separation vessel 48. To optimize stripping of $H_2S$ from the solution in separation vessel 48, the solution should be at a pH below 7.0, since $S^{2-}$ solubility is greatly increased at higher pH values.

As an example, bioreactor 14 may be continuously fed a solution containing approximately 2 g/L sulfate (2000 ppm) and having a pH of approximately 4. Inorganic gases from partial oxidation burner 31 may be fed into bioreactor 14 at a rate which provides at least 1.9 liters of $H_2$ gas (at standard temperature and pressure) per liter of sulfate solution. Additional nutrients added through pipe 39 for each liter of sulfate solution may include 0.05 grams of nitrogen (as $NH_3$), 0.007 grams of potassium (as $K_2O$), 0.006 grams of phosphorus (as $PO_4$) and a small supplement of amino acids. The amino acid supplement may be a broad mixture including most common amino acids, or a more select mixture, such as aspartic acid, glutamic acid, leucine and lysine in a 1:1:1:1 mixture. The bioreactors may operate at a solution temperature of 25°–30° C. Solutions to be treated under such conditions may range in concentration from 0.5 to 25 g/L sulfate, with a pH ranging from 2.5 to 9.0. The volume of gas added to the solution will vary directly in proportion to the sulfate content of the feed solution. The volume of trace nutrients to be added to the solution is less dependant on the sulfate concentration of the solution.

The $H_2S$ produced by sulfate reduction in the bioreactors may be continuously stripped from the solution primarily by the inert $N_2$ carrier gas provided by partial oxidation burner 31. Ideally, only $N_2$ and $H_2S$ gases emerge from separation vessels 40, 48. In practice, there may also be lesser amounts of unused CO, $CO_2$, and/or $H_2$ in the gases vented from separation vessels 40, 48. The stripped gases may be transported to the chemical stage of the process for use in precipitation of metal sulfides.

The biological reactions which reduce sulfate to sulfide in bioreactor 14 will also generate carbonate compounds, thus raising the solution pH. These carbonates may include calcium carbonate and magnesium carbonate, both of which are only sparingly soluble under most conditions. The solubility of one, or both of these compounds may be exceeded in bioreactor 14 effluent solution, resulting in precipitation of the carbonate compounds.

Because of the pH dependant nature of carbonate ionization in solution, these compounds can be precipitated rapidly by aerating the bioreactor effluent solution to increase its pH. The principal reason for this precipitation is believed to be the conversion of $HCO_3^-$ ion to $CO_3^{2-}$ ion as the pH rises, inducing the formation of $CaCO_3$ and $MgCO_3$. This precipitation step reduces total dissolved solids in the solution and facilitates the recovery of solid carbonate compounds.

Recovered carbonate compounds may be added to the solution through pipe 30 to adjust the pH of the Solution. Alternatively, bioreactor effluent solution my itself be added to the solution through the portion of pipe 30 shown in FIG. 1 to increase the pH of the solution. However, use of solid carbonate compounds to adjust solution pH does not dilute the incoming acidic solution stream to the same degree as does the addition of bioreactor effluent solution.

Precipitation of $MgCO_3$ may be of particular utility in adjusting the pH of the solution because the magnesium cation will not cause the formation of an insoluble sulfate salt when added to the sulfate containing solution. On the other hand, gypsum ($CaSO_4$) may be formed by the calcium cation when the sulfate content of the waste stream is high. Use of $MgCO_3$ to adjust pH may therefore minimize the formation of waste solids and leave sulfate in solution so that it remains available for use in bioreactor 14.

As shown in FIG. 3, precipitation of carbonate compounds may take place in a contactor 54 in which bioreactor effluent solution is contacted with air under high shear miming conditions. Air may be added to bioreactor effluent solution by in-line mixer 53. Discharge from contactor 54 passes through a settling device 56, such as a thickener or clarifier, from which the precipitated carbonate solids may be recovered through port 58. A portion of the settled carbonate compound (e.g. 100–200% of the amount of new solids being formed) is returned via pipe 60 to contactor 54 to seed carbonate compound nucleation.

The process of precipitating carbonate compounds can be carried out in 1 or 2 stages. Two stages may, for Example, be used if $CaCO_2$ is to be recovered separately from $MgCO_3$, with contact and settling time being the key parameter varied between the two stages. $CaCO_3$ formation would generally occur in the first such stage, as it is less soluble than $MgCO_3$.

In some treatment applications, the requirement for carbonate compounds may be the controlling factor in determining the amount of solution to be treated in bioreactor 14. In such cases, it is likely that more hydrogen sulfide will be generated than is required for metal sulfide precipitation. In addition, there will often be some amount of excess sulfide added to the precipitation circuit, which should generally be removed from the solution prior to final discharge of the solution to the environment.

To utilize excess hydrogen sulfide, the process of the invention may include a stage in which $H_2S$ entrained in a carrier gas is introduced into a mix tank and reacted with alkaline calcium or sodium compounds in aqueous or slurry form, to create calcium or sodium sulfide salts. These sulfide salts may either be sold as a product or re-used as a sulfide source in the precipitation circuit. The alkaline calcium compounds may be either CaO or $Ca(OH)_2$, which react with hydrogen sulfide to form CaS. The alkaline sodium compounds may be either $Na_2CO_3$ or NaOH, which react with hydrogen sulfide to form $Na_2S$ or NaHS.

The production of sulfide salts may involve multi-stage counter-current contacting of the alkali calcium or sodium compounds with the $H_2S$ stream, so that a high concentration sulfide product can be produced through contact with high strength $H_2S$ while fresh alkali is contacted with a depleted $H_2S$ gas stream to ensure complete $H_2S$ removal before the carrier gas is exhausted or recycled back into the process.

Following treatment of the solution to remove metal ions, residual sulfide ions in the solution may be removed from the solution prior to discharging the solution to the environment. Residual sulfide may be removed by stripping hydrogen sulfide from the solution into a carrier gas stream. Stripping of residual hydrogen sulfide may be carried out in a stripping vessel 62 at the end of the metal precipitation stage of the process. The volume of stripping vessel 62 should be relatively small, having a retention time as low as 1 or 2 minutes, with high shear mixing and fine gas dispersion. The strip gas may be air, or a recirculated gas from another stage of the process, such as nitrogen carrier gas from which the $H_2S$ has been previously removed.

The relatively low pH of the solution following treatment to precipitate metal sulfides (typically less than 6.5) makes removal of residual hydrogen sulfide more efficient. The solubility of sulfide decreases rapidly at pH values less than 7.0. Hydrogen sulfide gas may therefore be stripped from the low pH solution in the form of $H_2S$ gas. The effectiveness of this step will therefore be best when the final discharge pH is lowest. The $H_2S$ stripped from solution in this stage may be reused for metal sulfide precipitation or converted to a saleable product such as a sulfide salt.

As will be apparent to those skilled in the art in the light of the foregoing disclosure, many alterations and modifications are possible in the practice of this invention without departing from the spirit or scope thereof:

(a) In addition to solutions containing sulfate and metal ions, solids and gases may be treated in accordance with the invention, but generally must enter a dissolution stage prior to treatment;

(b) The process may be used either as a stand-alone system to treat a waste stream to the desired discharge quality, or as a pre-treatment system to improve the operation of an existing treatment plant, such as one employing neutralization and hydroxide precipitation;

(c) Metals that don't form sulfides (aluminum and chromium for example) may be removed from the solution in other forms, such as carbonates, oxides or hydroxides, using methods known in the art of the invention; Accordingly, the scope of the invention is to be construed in accordance with the substance defined by the claims.

EXAMPLE

Piloting of aspects of the process of the invention was conducted in a 100L, fully integrated biological stage and chemical stage process that was operated extensively with five different solution samples. The samples were obtained from acid mine drainage (AMD).

TABLE 1

| Head analysis of solution treated. | | |
|---|---|---|
| Parameter | Units | Assay |
| pH | — | 2.45 |
| As | mg/L | 12 |
| Co | mg/L | 8 |
| Mg | mg/L | 1,500 |
| Zn | mg/L | 273 |
| sulfate | mg/L | 20,000 |
| Ca | mg/L | 400 |
| Cu | mg/L | 190 |
| Mn | mg/L | 313 |
| Al | mg/L | 1200 |
| Cd | mg/L | 2 |
| Fe | mg/L | 2,300 |
| Ni | mg/L | 18 |

In order to evaluate the process of the invention prior to on-site demonstration, the 100 L system was operated for a 75 hour continuous run treating a strong solution sample .(table 1). The objective of the 75 hour run was to treat the solution to discharge quality using only bacterially-generated products in a stand-alone laboratory pilot system. To do this, all pH adjustment was done with bioreactor products, and all precipitation was done with bioreactor off-gas. Data included here is from the 75 hour demonstration. Discharge requirements are listed in table 2.

TABLE 2

| Discharge requirements. | | |
|---|---|---|
| Parameter | Units | Value |
| pH | — | >5.5 |
| Cu | mg/L | <0.05 |
| Zn | mg/L | <0.2 |

Methods and Materials

The configuration of the pilot process discussed in this Example differs from the process configuration illustrated in FIGS. 1–3. The chemical precipitation circuit consisted of three series-configured acrylic reactors of 6 L, 5 L, and 6 L, respectively. Each of these vessels was agitated by a magnetic stirring plate, and was followed in the circuit by a 1.5 L cylindrical glass settling vessel (thickener) with a conical base. The first precipitation reactor was pH-monitored, whereas the final two were pH-controlled at desired values. Peristaltic pumps transferred the solution through the circuit for contacting with bioreactor off-gas.

The biological stage of the pilot system consisted of two 40L polyvinylchloride anaerobic bioreactors. Solution exiting the chemical precipitation stage was mixed with nutrients (see Table 3 below) in batches of 20 to 50 L to be fed to the bioreactors. A single peristaltic pump moved solution through the series-configured bioreactor stage. Nitrogen gas travelled through the system to carry the product hydrogen sulfide to the chemical precipitation circuit. Bioreactors were maintained at 30° C. with submersible heaters.

TABLE 3

| Nutrient additions used in test work. | | |
|---|---|---|
| Nutrient | Source | Addition |
| N | $NH_4Cl$ | 0.35 g/L |
| P, K | $KH_2PO_4$ | 0.06 g/L |
| C, H | 90/10 Ethanol/Methanol | 1 g/g $SO_4^{2-}$ |

The mixed bacterial culture was originally obtained from bog water. This culture has been adapted to a variety of specific operating conditions.

Analyses

Dissolved sulfate was determined by turbidimetric analysis with a spectrophotometer at an absorption wavelength of 420 nm, following barium sulfate precipitation at low pH. Bioreactor off-gas analyses were performed using an SRI 8610 Gas Chromatograph equipped with a nine foot long, ⅛" O.D. teflon column packed with 100/120 mesh Hayesep D material, and a Thermal Conductivity Detector. Solid and solution samples were analyzed by ICP for trace metal concentration analysis, and by Atomic Absorption Spectrophotometry for particular metals present in high concentrations.

Results

All results were obtained during the 75 hour continuous, integrated pilot run. Prior to the commencement of the 75 hour continuous run, the system had been operated extensively with different solution samples and sulfate streams. The two bioreactors had been operated continuously for seven months and four months, respectively. The precipitation circuit had been operated for shorter periods over a four month period to determine the optimum system configuration. In the week preceding the 75 hour run the bioreactors began treating pure (non-diluted) chemical stage discharge solution, and the chemical stage completed multiple shorter runs sufficient to ensure a complete change-over from previous solution testing.

Figure 4:
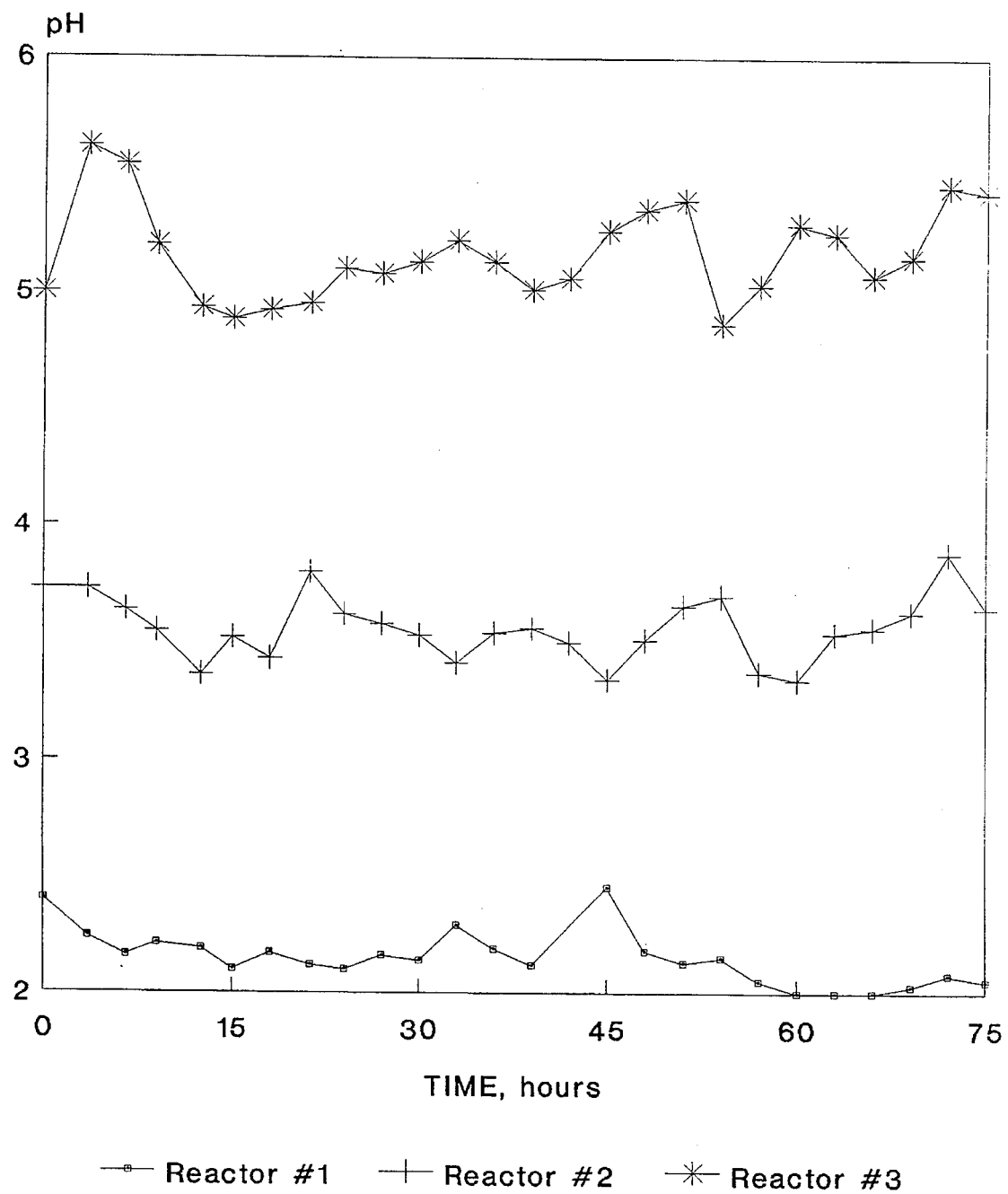
FIG. 4 is a graph showing results from an experimental trial of the process of the invention.

The system performed well throughout the demonstration, experiencing no mechanical upsets or failures, and meeting the strict discharge requirements for the duration of the test utilizing only microbially-generated products. As shown in FIG. 4, chemical stage pH values were held near the target values of 2.0, 3.5, and 5.2 in reactors one, two, and three, respectively. It is important to note that the pH of third precipitation reactor does not need to meet the discharge requirement of greater than 5.5. Bioreactor product solution and treated solution are mixed to form the final discharge solution of the process. With the addition of bioreactor effluent, the pH of final discharge solution during the pilot run was consistently greater than 5.5.

Figure 5:
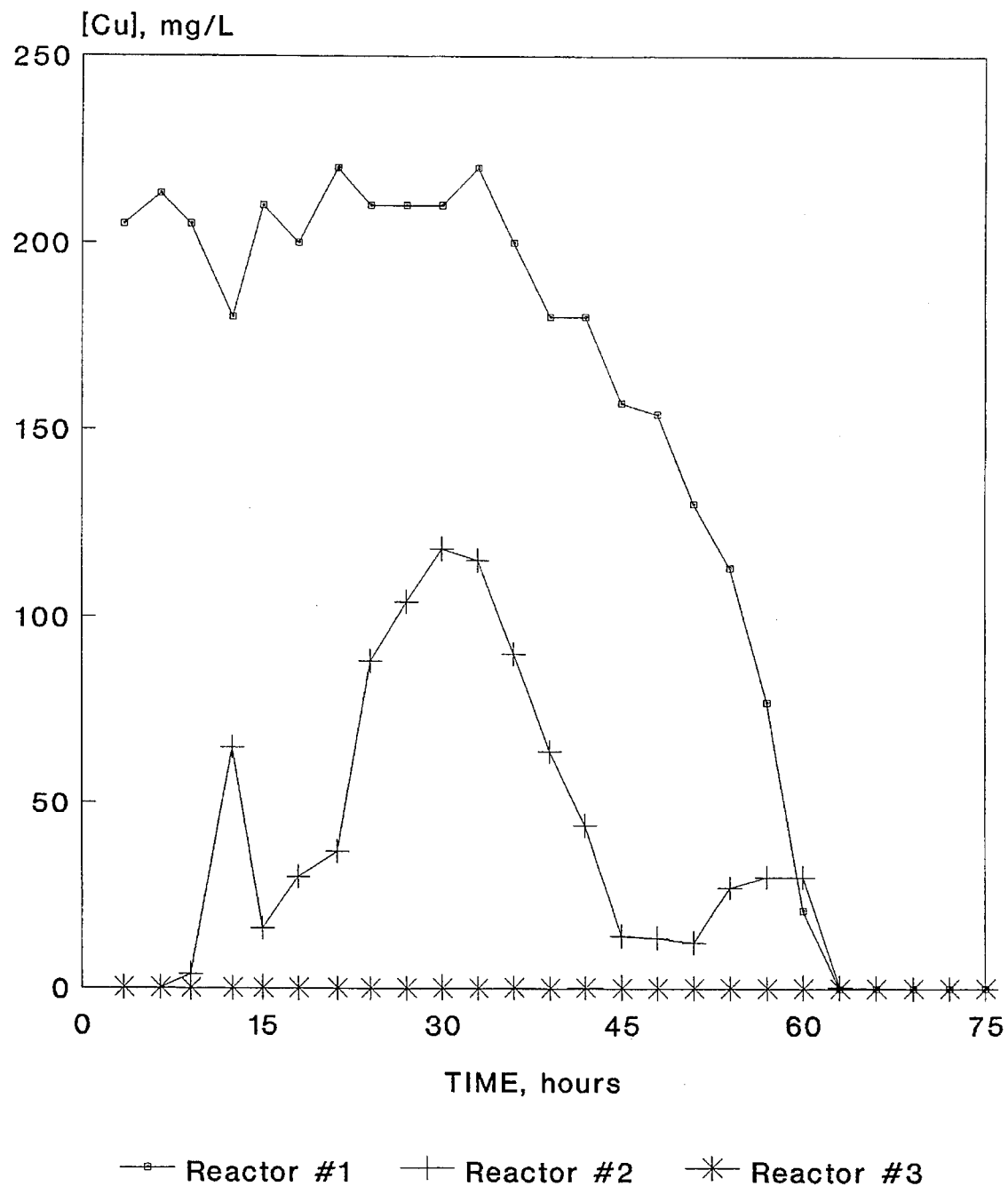
FIG. 5 is a graph showing chemical stage dissolved copper levels during 75 hour continuous acid mine drainage treatment.
Figure 6:
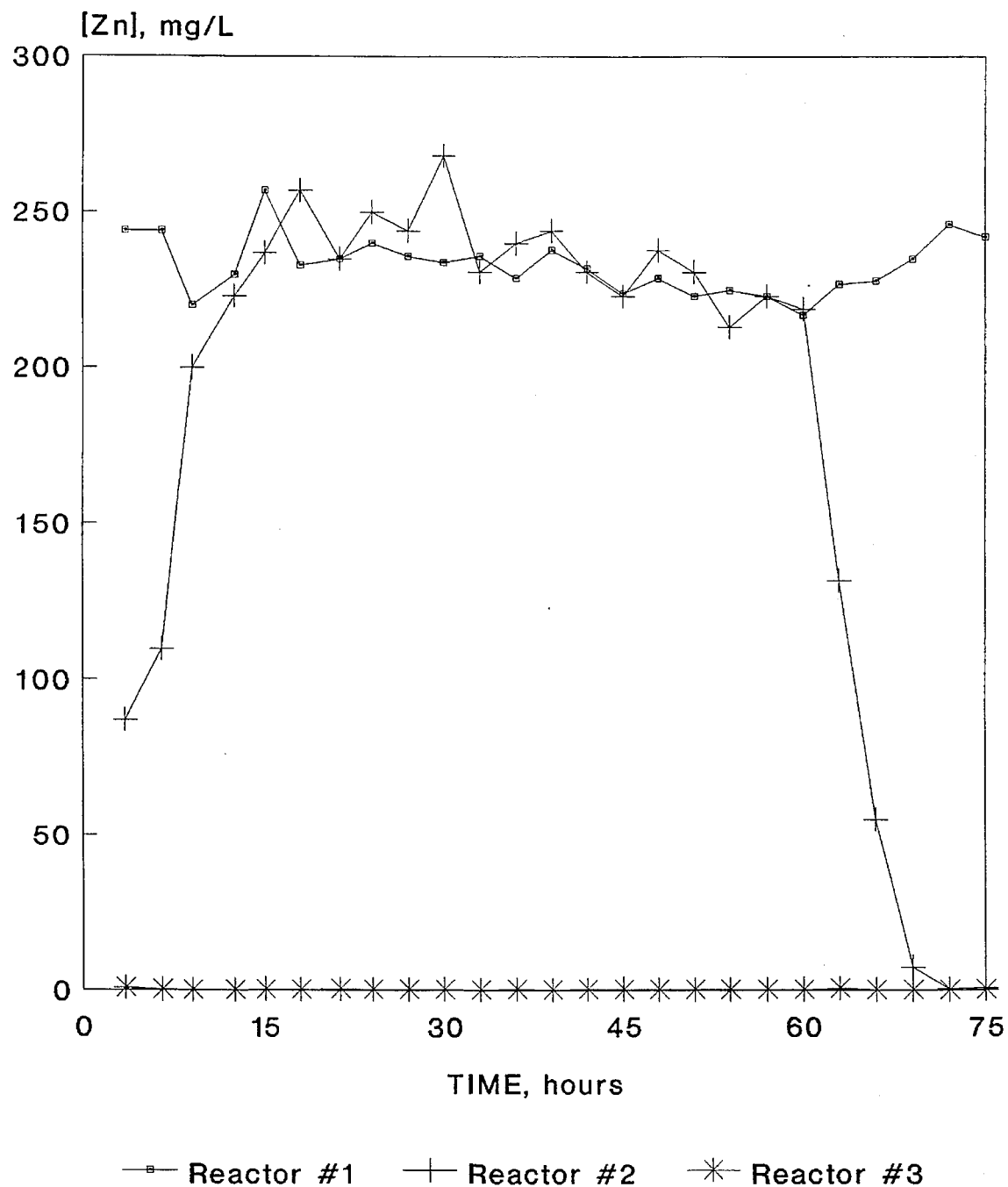
FIG. 6 is a graph showing chemical stage dissolved zinc levels during 75 hour continuous acid mine drainage treatment.
Figure 7:
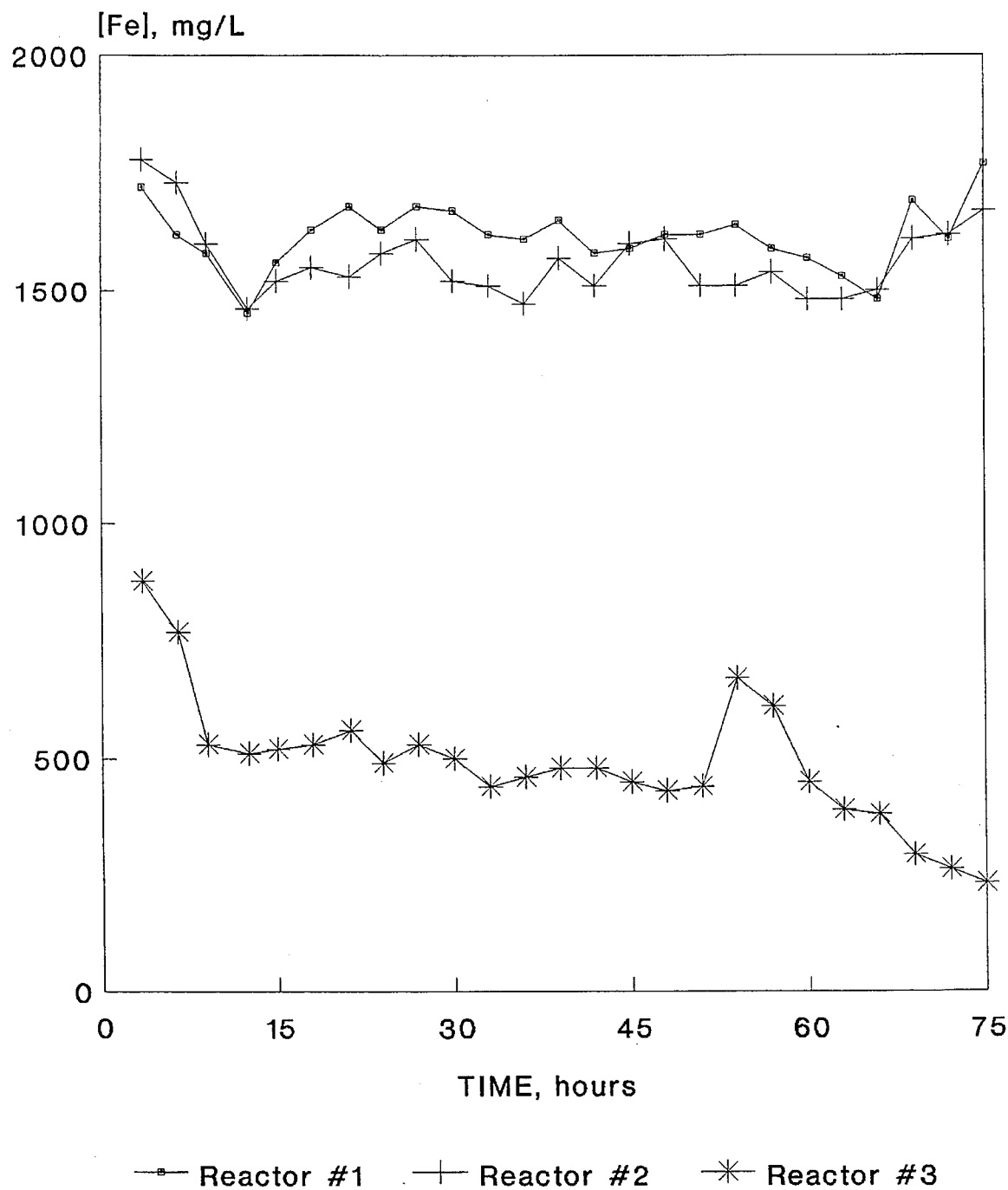
FIG. 7 is a graph showing chemical stage dissolved iron levels during 75 hour continuous acid mine drainage treatment.

Chemical stage copper, zinc, and iron concentrations are shown in FIG. 5 for the duration of the experimental pilot run. Together, the graphs in FIG. 5 demonstrate the precipitation trends within the three-reactor chemical stage.

TABLE 4

Summary of 75 hour continuous operation.

| Parameter | Units | Hour 0–60 | Hour 60–75 |
|---|---|---|---|
| AMD treated: | L | 44.30 | 7.30 |
| AMD feed rate: | L/hr | 0.74 | 0.49 |
| Chemical stage retention: | hrs | 22.30 | 33.70 |
| Bioreactor solution added: | L | 63.60 | 13.90 |
| Recirculating load: | % | 144 | 190 |

Prior to hour 60 of operation, the formation of copper sulfide was occurring primarily in the second and third reactors, not in the first reactor as intended (see FIG. 5). Similarly, zinc sulfide was forming primarily in the third reactor and not in the second, as intended (see FIG. 5). On hour 60, the flow rate of solution through the chemical stage was decreased (Table 4). Following this change, a substantial improvement in the selective precipitation of copper and zinc sulfides can be noted, with copper sulfide forming in the first precipitation reactor, and zinc sulfide in the second. Iron precipitated primarily in the third reactor for the duration of the demonstration (FIG. 5). Aluminum hydroxide also precipitated primarily in the third reactor, as evidenced by the product concentrate/sludge analyses (Table 5).

TABLE 5

Precipitate analysis in %.

| Residue | Al | Cu | Fe | S | Zn |
|---|---|---|---|---|---|
| Precipitate #1 | — | 10.0 | 0.24 | 89.8 | 0.06 |
| Precipitate #2 | 2.5 | 13.1 | 10.7 | 25.8 | 6.18 |
| Precipitate #3 | 8.5 | 0.3 | 8.95 | 24.9 | 2.11 |

The composition of the final discharge solution is determined by the third precipitation reactor, as this solution forms the greatest fraction of the ultimate discharge solution. The third precipitation reactor solution is diluted with bioreactor product solution, which contains no metals.

Table 4 shows a summary of the pilot run, presenting the volumes and flow rates of solution treated, as well as the volume of bioreactor product solution added to meet the alkalinity requirements for solution neutralization in the chemical stage.

Product precipitate grades from the final (optimum) 15 hours of operation are presented in Table 5. The formation of isolated copper and zinc concentrates, along with a mixed (aluminum and iron) waste sludge for disposal, is demonstrated.

As shown in Table 6, bioreactor performance was reliable and consistent throughout the pilot run, maintaining an average sulfate reduction of 85% at retention times of approximately 40 hours each. Biological data is presented from the time at which the bioreactors began feeding pure (non-diluted) chemical stage discharge on day 245 to day 255. The 75 hour run spanned days 252 to 255. Bioreactor percent sulfate reduction values presented in Table 6 consider the influent and effluent sulfate of each bioreactor only and are therefore not cumulative. Overall sulfate reduction is presented in the product data section of Table 6.

TABLE 6

Operating data prior to and during 75 hour pilot run:

| Parameter | Units | High | Low | Average |
|---|---|---|---|---|
| Days 245 to 251. | | | | |
| Feed | | | | |
| pH | — | 6.40 | 6.00 | 6.13 |
| rate | L/d | 24.5 | 22.0 | 23.3 |
| sulfate | mg/L | 8271 | 6810 | 7482 |
| First Bioreactor | | | | |
| pH | — | 5.89 | 5.14 | 5.42 |
| sulfate | mg/L | 4560 | 4105 | 4294 |
| $SO^{2-}$ reduction | % | 50.4 | 33.0 | 42.0 |
| rate | mg/L/d | 2457 | 1269 | 1850 |
| retention time | hrs | 42.5 | 38.2 | 40.2 |
| Second Bioreactor | | | | |
| pH | — | 8.30 | 7.67 | 7.94 |
| sulfate | mg/L | 1385 | 1167 | 1289 |
| $SO^{2-}$ reduction | % | 74.4 | 67.2 | 69.8 |
| rate | mg/L/d | 2085 | 1789 | 1889 |
| retention time | hrs | 39.1 | 35.5 | 36.9 |
| Product data | | | | |
| pH | — | 8.46 | 7.90 | 8.15 |
| sulfate | mg/L | 1170 | 757 | 995 |
| tot. $SO^{2-}$ reduction | % | 90.8 | 84.1 | 86.5 |
| off-gas $H_2S$ | % | 4.8 | 1.2 | 3.0 |
| Days 252 to 255. | | | | |
| Feed | | | | |
| pH | — | 6.21 | 6.04 | 6.14 |
| rate | L/d | 24.7 | 21.5 | 23.2 |
| sulfate | mg/L | 7364 | 5780 | 6597 |
| First Bioreactor | | | | |
| pH | — | 5.36 | 5.17 | 5.27 |
| sulfate | mg/L | 4830 | 3462 | 4239 |
| $SO^{2-}$ reduction | % | 46.6 | 24.2 | 35.5 |
| rate | mg/L/d | 2175 | 889 | 1415 |
| retention time | hrs | 43.5 | 37.8 | 40.5 |
| Second Bioreactor | | | | |
| pH | — | 7.84 | 7.44 | 7.63 |
| sulfate | mg/L | 1380 | 268 | 933 |
| $SO^{2-}$ reduction | % | 92.3 | 69.5 | 78.6 |
| rate | mg/L/d | 2577 | 1890 | 2137 |
| retention time | hrs | 40.0 | 34.7 | 37.2 |
| Product data | | | | |
| pH | — | 8.39 | 7.88 | 8.16 |
| sulfate | mg/L | 1700 | 337 | 1024 |
| tot. $SO^{2-}$ reduction | % | 94.2 | 75.3 | 84.9 |
| off-gas $H_2S$ | % | 3.1 | 2.0 | 2.6 |

Discussion

The biological stage of the system performed well throughout the duration of continuous testing, providing a reliable source of hydrogen sulfide and alkalinity for use in the chemical stage. One of the two bioreactors in the 100L pilot system operated continuously at retention times of 21 to 44 hours for 14 months, without interruption or a decline in performance. The dependability of the biological stage is a result of both the bioreactor design and the configuration of the process. By placing the chemical stage prior to the biological stage, the bioreactors receive an almost metal-free solution, and sulfate loading can be controlled to maintain optimum bioreactor performance.

Like the biological stage, the chemical stage performed reliably throughout the pilot run. However, it was only with a substantial reduction of chemical stage feed rate that the precipitation of sulfides occurred in the desired vessel.

Inadequate hydrogen sulfide/solution contacting my have resulted in the slowed reaction kinetics observed in the pilot run. Improvements in precipitation reactor design may bring a substantial increase in the rate of sulfide formation as well as in the efficiency of sulfide utilization over the experimental test system.

Three product sludges were isolated from the solution. Copper and zinc sulfide concentrates may be sold to smelters to offset treatment costs during commercial-scale operation. A third sludge, suitable for disposal, consisted primarily of iron, aluminum, and sulfur. A substantial reduction in disposal sludge volume is achieved by recovering selected metal sulfides. Sulfides are much less prone to re-dissolution than their hydroxide counterparts (which may be obtained by lime precipitation), resulting in increased long-term sludge stability.

The copper and zinc grade of the product concentrates were not as high as previous batch test work has demonstrated to be possible. This was due primarily to dilution of the precipitates by the formation of large quantities of elemental sulfur. Sulfur was formed by the reaction of sulfide and ferric iron, as shown below. In addition to diluting and increasing the volume of the product sludges, the reaction also incurs substantial losses of sulfide, placing greater demand on the bioreactors.

$$S^{2-}+2Fe^{+++}\rightarrow S^0_{(s)}+2Fe^{++}$$

The occurrence of this reaction was verified by the presence of ferrous iron and elemental sulfur in the precipitates. This problem could be addressed in part by utilizing 'fresh' solution. The sample tested had been stored for approximately two months, permitting the slow, ongoing oxidation of ferrous iron to ferric iron to take place. Substantial quantities of ferric hydroxide were noted in the storage drums as a result of this oxidation. Utilization of 'fresh' solution (with a more favourable Fe++:Fe+++ ratio) would reduce sulfide losses to this reaction. Also, an additional precipitation reactor added to precede the copper precipitation reactor may be used to convert ferric iron to ferrous iron prior to copper sulfide precipitation, to permit the production of a higher grade copper concentrate. The additional precipitation reactor may produce a sludge with a high sulfur content, and may necessitate the production of greater amounts of hydrogen sulfide.

Conclusions

The results of continuous process piloting in a 100L system demonstrate aspects of the process of the invention. A strong solution (2.45, 20 g/L $SO_4=$, 4 g/L dissolved metals) sample was treated to discharge requirements utilizing only bacterially-generated reagents in a reliable, consistent manner. Dissolved metal levels were reduced to below discharge requirements for the duration of the run. Metal concentrations in the process discharge were consistently far below those typical of conventional lime treatment processes, in part because metal sulfides are much less soluble than their hydroside counterparts, most often by several orders of magnitude. The treatment was also successful in meeting discharge pH requirements throughout the run.

In addition to treating the stream successfully, copper and zinc sulfide concentrates were isolated to demonstrate the potential for the process to offset operating costs through production of saleable co-products.

References

Barnes, L. J., F. J. Janssen, J. Sherren, J. H. Versteegh, R. O. Koch, and P. J. H. Scheeren. 1991. A new process for the microbial recovery of sulphate and heavy metals from contaminated waters extracted by a geohydrological control system. Chemical Engineering Research and Design 69:184–186.

Barnes, L. J., F. J. Janssen, P. J. H. Scheeren, J. H. Versteegh, and R. O. Koch. 1992. Simultaneous microbial removal of sulphate and heavy metals from waste water. Transactions of the Institution of Mining and Metallurgy 101:C183–C199.

Bhattacharyya, D., G. Sun, C. Sund-Hagelberg, and K. Schwitzgebel. 1981. Precipitation of heavy metals with sodium sulfide: Bench-scale and full-scale experimental results. AIChE Symposium Series 77(209):31–38.

Dvorak, D. H., H. M. Edenborn, R. S. Hedin, and P. E. McIntire. 1991. Treatment of metal-contaminated water using bacterial sulfate reduction: results from pilot-scale reactors. In Proceedings of the 1991 SME Annual Meeting. (Denver, Colo., Feb. 25–28,1991).

Gyure, R. A., A. Konopka, A. Brooks, and W. Deemel. 1990. Microbial sulfate reduction in acidic (pH 3) strip-mine lakes. FEMS Microbiology Ecology 73:193–202.

Hammack, R. W., D. H. Dvorak, and H. M. Edenborn. 1993. The use of biogenic hydrogen sulphide to selectively recover copper and zinc from severely contaminated mine drainage. Biohydrometallurgical Technologies, Proceedings of the International Biohydrometallurgy Symposium, Jackson Hole, Wyo. Edited by A. E. Torma, J. E. Way, The Minerals, Metals and Materials Society. p. 631–639.

Hammack, R. W., D. H. Dvorak, and H. M. Edenborn. 1994. Selective metal recovery using biogenic hydrogen sulfide: Rio Tinto mine, Nevada. In Proceedings of the International land Reclamation and Mine Drainage Conference and the Third International Conference on the Abatement of Acidic Mine Drainage. (Pittsburgh, Pa., Apr. 24–29, 1994).

Kim, B. M. 1981. Treatment of metal containing wastewater with calcium sulfide. AIChE Symposium Series 77(209):39–48.

Mares, J. P., A. Gerber, and W. F. Strydon. 1986, A biological process for sulphate removal from industrial effluents. Water SA 12(3):139–144.

Males, J. P., G. Hulse, D. Dods, and C. E. Schutte. 1987. An integrated process for biological treatment of sulfate-containing industrial effluents. Journal Water Pollution Control Federation. 59 (12): 1069–1074.

Tuttle, J. H., P. R. Dugan, and C. I. Handles. 1969. Microbial sulfate reduction and its potential utility as an acid mine water pollution abatement procedure. Applied Microbiology 17(2):297–302.

What is claimed is:

1. A process for treating a solution containing sulfate ions and metal ions, comprising the steps of:

(a) adding hydrogen sulfide to the solution;

(b) precipitating a sulfide of the metal ions from the solution;

(c) feeding a portion of the solution to an anaerobic microbiological culture that utilizes the sulfate ions and produces hydrogen sulfide;

(d) feeding the anaerobic microbiological culture gaseous nutrients comprising hydrogen and a carbon oxide, the gaseous nutrients being produced by a partial oxidation burner;

(e) stripping hydrogen sulfide produced by the microbiological culture from the solution; and, (f) recirculating a portion of the hydrogen sulfide stripped from the solution in step (e) to be used in step (a).

2. The process of claim 1 wherein steps (b) and (c) are substantially physically separated.

3. The process of claim 1 wherein the hydrogen sulfide is stripped from the solution in step (e) using a carrier gas produced by the partial oxidation burner.

4. The process of claim 3 wherein:
   a. the partial oxidation burner is fed a mixture comprising air and a hydrocarbon fuel; and,
   b. the mixture is combusted within the partial oxidation burner to produce the gaseous nutrients and nitrogen carrier gas.

5. The process of claim 4 wherein:
   (a) the hydrocarbon fuel is selected from the group consisting of methane, natural gas and propane;
   (b) the mixture fed to the burner comprises approximately 0.3 liters of hydrocarbon fuel per liter of air; and,
   (c) a blend of the gaseous nutrients and the carrier gas is produced by the partial oxidation burner, the blend being selected from the group consisting of:
       (i) approximately 20% CO, 40% $H_2$ and 40% $N_2$; and,
       (ii) approximately 17% CO,, 50% $H_2$ and 33% $N_2$.

6. The process of claim 1 wherein the anaerobic microbiological culture comprises naturally-occurring sulfate reducing bacteria.

7. The process of claim 6 wherein the anaerobic microbiological culture is serially adapted for improved performance in treating the solution and in utilizing the gaseous nutrients.

8. The process of claim 1 wherein steps (c) and (d) are carried out in a bioreactor comprising:
   (a) a hollow body having an interior for holding the solution under anaerobic conditions, the hollow body having a top portion and a bottom portion;
   (b) an input port for introducing the solution into the bottom portion of the interior of the hollow body; and,
   (c) an output port for removing solution from the top portion of the interior of the hollow body.

9. The process of claim 8 further comprising the steps of feeding the solution into a separation vessel and degassing the solution in the separation vessel, wherein:
   (a) the solution is passed from the bioreactor output port to the separation vessel for degassing;
   (b) the separation vessel has an upper portion, a lower portion, a gas vent for venting gas on its upper portion, and a solution discharge port for discharging the solution on its lower portion; and,
   (c) at least a portion of the solution discharged from the separation vessel is recycled to the bioreactor.

10. The process of claim 9 wherein a portion of the solution fed into the separation vessel has not been treated in the bioreactor, thereby reducing the pH of the solution in the separation vessel and thereby reducing the solubility of $H_2S$ in the solution in the separation vessel.

11. The process of claim 10 further comprising a second separation vessel in fluid communication with the bioreactor output port and the separation vessel, wherein:
    (a) the solution is passed from the bioreactor output port to the second separation vessel;
    (b) a portion of the solution in the second separation vessel is passed to the separation vessel;
    (c) a portion of the solution in the second separation vessel is discharged without being passed to the separation vessel;
    (d) the second separation vessel having an upper portion and a lower portion and a second gas vent on its upper portion and a second solution discharge port on its lower portion.

12. The process of claim 9 further comprising the step of aerating the solution after the solution is discharged from the separation vessel to precipitate a carbonate compound.

13. The process of claim 12 wherein the step of precipitating the carbonate compound comprises:
    (a) aerating the solution under high shear miming conditions in a tank;
    (b) discharging the solution from the tank into a settling device; and,
    (c) precipitating the carbonate compound from the solution in the settling device.

14. The process of claim 13 wherein a portion of the precipitated carbonate compound is recirculated to the tank to nucleate precipitation of the carbonate compound.

15. The process of claim 12 wherein the step of precipitating the carbonate compound comprises the selective precipitation of a first and a second carbonate compound by:
    (a) aerating the solution under high shear mixing conditions in a tank to precipitate the first carbonate compounds
    (b) discharging the solution from the tank into a settling device;
    (c) precipitating the carbonate compound from the solution in the settling device;
    (d) transferring the solution from the settling device to a second tank;
    (e) aerating the solution under high shear mixing conditions in the second tank to precipitate the second carbonate compound;
    (f) discharging the solution from the second tank into a second settling device; and,
    (g) precipitating the second carbonate compound from the solution in the second settling device.

16. The process of claim 15 wherein the carbonate compound and the second carbonate compound are selected from the group consisting of $MgCO_3$ and $CaCO_3$.

17. The process of claim 1 further comprising the step of aerating the solution after the solution has been treated according to step 1(c) to precipitate a carbonate compound.

18. The process of claim 1 wherein the step of adding hydrogen sulfide to the solution comprises in-line mixing of hydrogen sulfide and the solution.

19. The process of claim 1 wherein the step of precipitating a sulfide of the metal ions from the solution comprises the steps of:
    (a) collecting precipitated metal sulfide solids; and,
    (b) adding a portion of the collected metal sulfide solids to the solution in conjunction with the step of adding hydrogen sulfide to the solution, to nucleate further precipitation of metal sulfide solids.

20. The process of claim 19 wherein the step of precipitating a sulfide of the metal ions from the solution is repeated and precipitation conditions are adjusted to precipitate a selected metal sulfide in each such step by one or more of the following steps:
    (a) adjusting the pH of the solution;
    (b) adjusting the hydrogen sulfide concentration of the solution; and,
    (c) adjusting the amount of collected metal sulfide solids that are added to the solution in conjunction with the step of adding hydrogen sulfide to the solution.

21. The process of claim I wherein the step of precipitating a sulfide of the metal ions from the solution is repeated and precipitation conditions are adjusted to precipitate a selected metal sulfide in each such step.

22. The process of claim 21 wherein the precipitation conditions are adjusted by one or more of the following steps:
   (a) adjusting the pH of the solution; and,
   (b) adjusting the hydrogen sulfide concentration of the solution.

23. The process of claim 1 wherein a portion of the hydrogen sulfide stripped from the solution in step (e) is reacted with an alkaline compound to produce a sulfide salt.

24. The process of claim 23 wherein the alkaline compound is selected from the group consisting of CaO, $Ca(OH)_2$, $Na_2CO_3$, and NaOH; and the sulfide salt is selected from the group consisting of CaS, $CaSH_2$, $Na_2S$ and NaHS.

25. The process of claim 1 further comprising the step of stripping hydrogen sulfide from a portion of the solution that is not fed to the microbiological culture, after the step of precipitating a sulfide of the metal ions from the solution.

26. The process of claim 25 wherein the hydrogen sulfide is stripped from the solution by mixing the solution with a carrier gas.

27. A process for treating a solution containing sulfate ions and metal ions, comprising the steps of:
   a. adding hydrogen sulfide to the solution:
   b. precipitating a sulfide of the metal ions from the solution;
   c. feeding a portion of the solution to an anaerobic microbiological culture that utilizes the sulfate ions and produces hydrogen sulfide;
   d. feeding the anaerobic microbiological culture gaseous nutrients comprising hydrogen and a carbon oxide;
   e. stripping hydrogen sulfide produced by the microbiological culture from the solution using a carrier gas; and
   f. recirculating a portion of the hydrogen sulfide stripped from the solution in step (e) to be used in step (a),
   wherein steps (c) and (d) are carried out in a bioreactor comprising:
      I) a hollow body having an interior for holding the solution under anaerobic conditions, the hollow body having a top portion and a bottom portion:
      II) an output port for removing solution from the top portion of the interior of the hollow body;
      III) an input port for introducing the solution into the bottom portion of the interior of hollow body, the input port comprising:
         i) a pipe passing into the interior of the hollow body through the top portion of the hollow body and extending downwardly to the bottom portion of the interior of the hollow body; and
         ii) hollow arms connected to the pipe and extending outwardly from the pipe in the bottom portion of the interior of the hollow body, the arms being in fluid communication with the pipe, the arms having apertures thereon;
            wherein the pipe and hollow arms are rotatable within the interior of the hollow body and the solution, the gaseous nutrients and the carrier gas are transported into the interior of the hollow body through the pipe, the hollow arms and the apertures on the hollow arms.

28. The process of claim 27 wherein:
   (a) the bioreactor further comprises a solid support material within the interior of the hollow body for supporting the microbiological culture; and,
   (b) the hollow arms further comprise blades extending therefrom far moving a precipitate within the interior of the hollow body.

29. A process for treating a solution containing sulfate and metal ions comprising the steps of:
   (a) adding hydrogen sulfide to the solution;
   (b) precipitating sulfides of the metal ions from the solution;
   (c) feeding a carbon nutrient and a portion of the solution to an anaerobic microbiological culture that:
      (i) utilizes the sulfate ions to produce hydrogen sulfide; and,
      (ii) utilizes the carbon nutrient to produce carbonate ions;
   (d) feeding the anaerobic microbiological culture gaseous nutrients comprising hydrogen and a carbon oxide, the gaseous nutrients being produced by a partial oxidation burner;
   (e) stripping hydrogen sulfide produced by the microbiological culture from the solution; and,
   (f) aerating the solution to precipitate a carbonate compound derived from the carbonate ions produced by the microbiological culture;
   wherein steps (b) and (c) are substantially physically separated and a portion of the hydrogen sulfide stripped from the solution in step (e) is used in step (a).

* * * * *